(12) United States Patent
Takagi et al.

(10) Patent No.: US 11,099,398 B2
(45) Date of Patent: Aug. 24, 2021

(54) VIRTUAL IMAGE DISPLAY APPARATUS

(71) Applicant: SEIKO EPSON CORPORATION, Tokyo (JP)

(72) Inventors: Masayuki Takagi, Azumino (JP); Takuya Ikeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/828,023

(22) Filed: Mar. 24, 2020

(65) Prior Publication Data
US 2020/0310139 A1 Oct. 1, 2020

(30) Foreign Application Priority Data

Mar. 25, 2019 (JP) .............................. JP2019-056096

(51) Int. Cl.
*G02B 6/32* (2006.01)
*G02B 27/01* (2006.01)
*F21V 8/00* (2006.01)

(52) U.S. Cl.
CPC ......... *G02B 27/0176* (2013.01); *G02B 6/003* (2013.01); *G02B 6/0086* (2013.01); *G02B 27/0172* (2013.01); *G02B 2027/0178* (2013.01)

(58) Field of Classification Search
CPC ................ G02B 27/0176; G02B 6/003; G02B 27/0172; G02B 6/0086; G02B 2027/0178
See application file for complete search history.

(56) References Cited

U.S. PATENT DOCUMENTS

| 4,024,312 A * | 5/1977 | Korpman ................ A61L 15/58 |
| | | 428/343 |
| 2017/0184853 A1* | 6/2017 | Takagi ............... G02B 27/0172 |
| 2018/0024368 A1* | 1/2018 | Takagi ............... G02B 27/0176 |
| | | 359/633 |
| 2018/0067317 A1* | 3/2018 | Barton ............... G02B 27/0176 |

FOREIGN PATENT DOCUMENTS

JP 2013-048394 A 3/2013

* cited by examiner

*Primary Examiner* — Ellen E Kim
(74) *Attorney, Agent, or Firm* — Oliff PLC

(57) ABSTRACT

A virtual image display apparatus is provided, which includes a case member housing an image element, a lens barrel housing a projection lens serving as an optical system configured to receive imaging light emitted from the image element, and an elastic sealing member that covers a space between the case member and the lens barrel. With the elastic sealing member, position adjustment between the case member and the lens barrel is performed.

13 Claims, 14 Drawing Sheets

VIRTUAL IMAGE DISPLAY APPARATUS

The present application is based on, and claims priority from JP Application Serial Number 2019-056096, filed Mar. 25, 2019, the disclosure of which is hereby incorporated by reference herein in its entirety.

BACKGROUND

1. Technical Field

The present disclosure relates to a virtual image display apparatus typified by a head-mounted display.

2. Related Art

One known head-mounted display is disclosed in JP-A-2013-48394. In this head-mounted display, a panel is precisely positioned relative to an optical system and then a gap portion is filled with a UV resin or a similar material to create a debris sealing structure. Note that the head-mounted display is also described as an HMD in the following.

However, in the device disclosed in JP-A-2013-48394, foreign material may adhere to each of the components in the device when the panel is precisely positioned. There is also the possibility that foreign material may enter through the front surface of the display unit thereafter if debris is not separately removed before performing the step for forming the debris sealing structure by filling the gap portion with UV resin or a similar material.

SUMMARY

A virtual image display apparatus according to one aspect of the present disclosure includes an image element, a case member housing the image element, an optical system configured to receive image light emitted from the image element, a lens barrel housing the optical system, and a sealing member that is elastic, the sealing member being configured to cover a space between the case member and the lens barrel.

DESCRIPTION OF EXEMPLARY EMBODIMENTS

Figure 1:
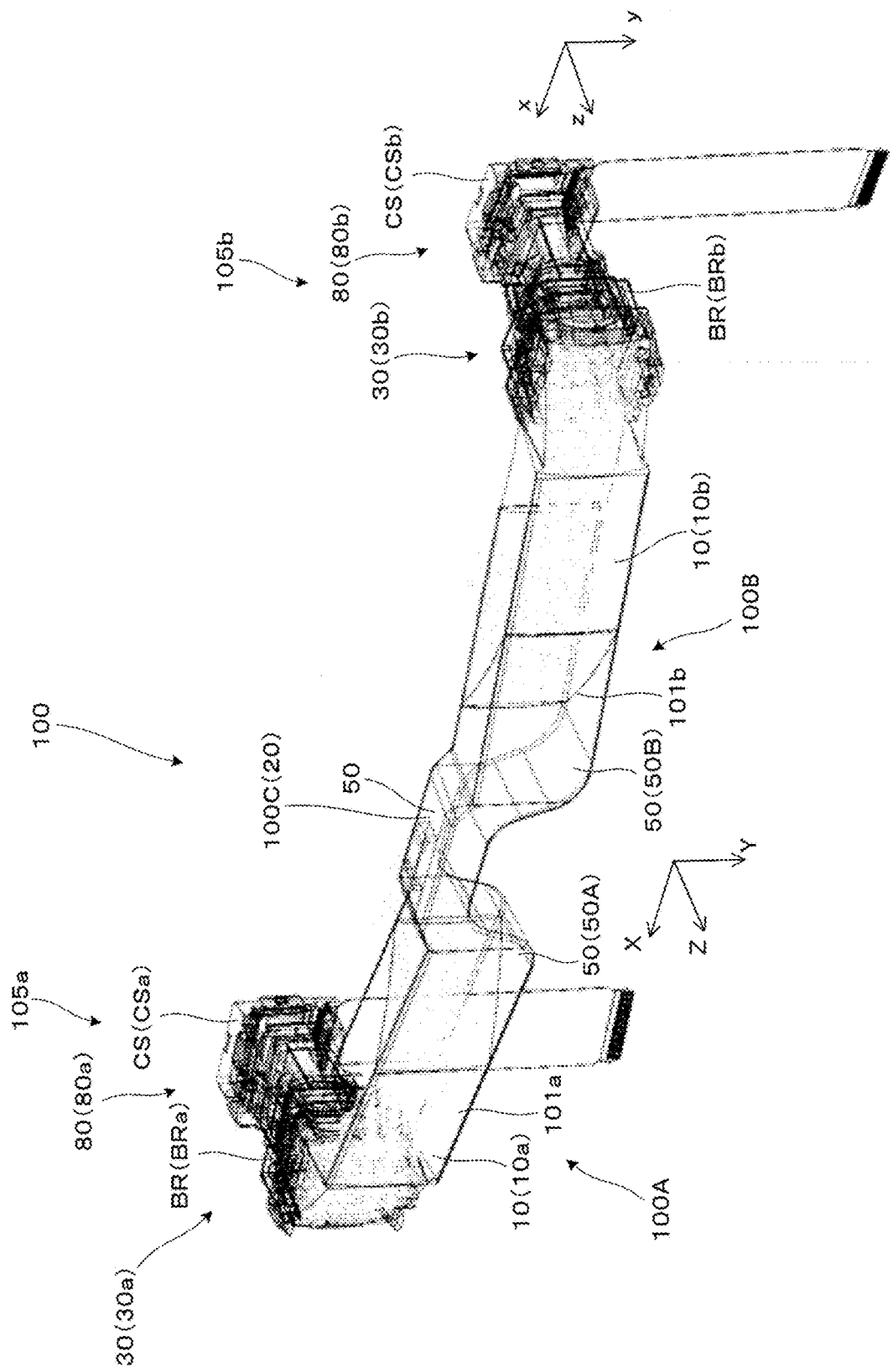
FIG. 1 is a perspective view illustrating an example of an optical system constituting a virtual image display apparatus according to one embodiment.
Figure 2:
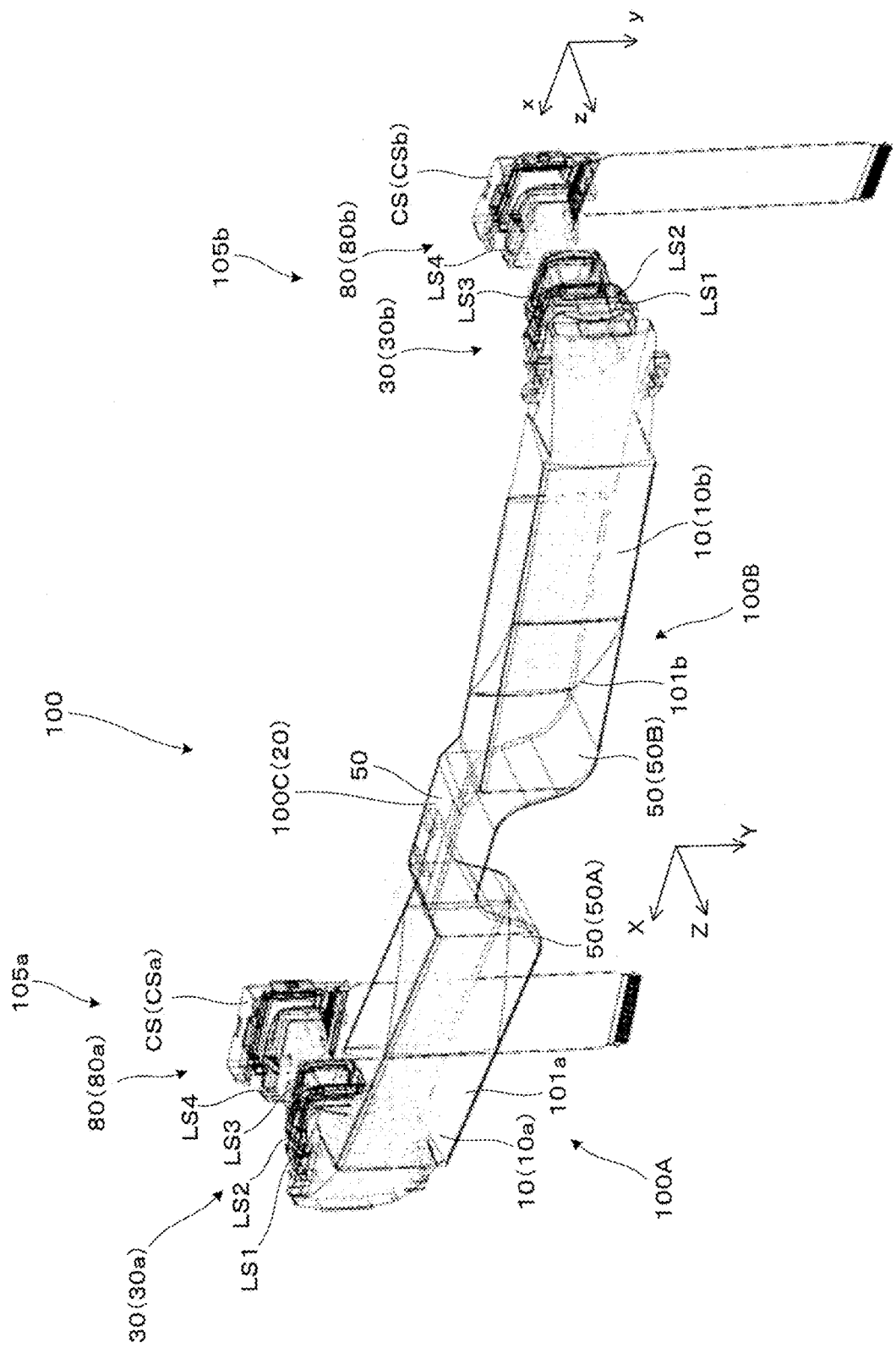
FIG. 2 is another perspective view illustrating an example of an optical system constituting a virtual image display apparatus.
Figure 3:
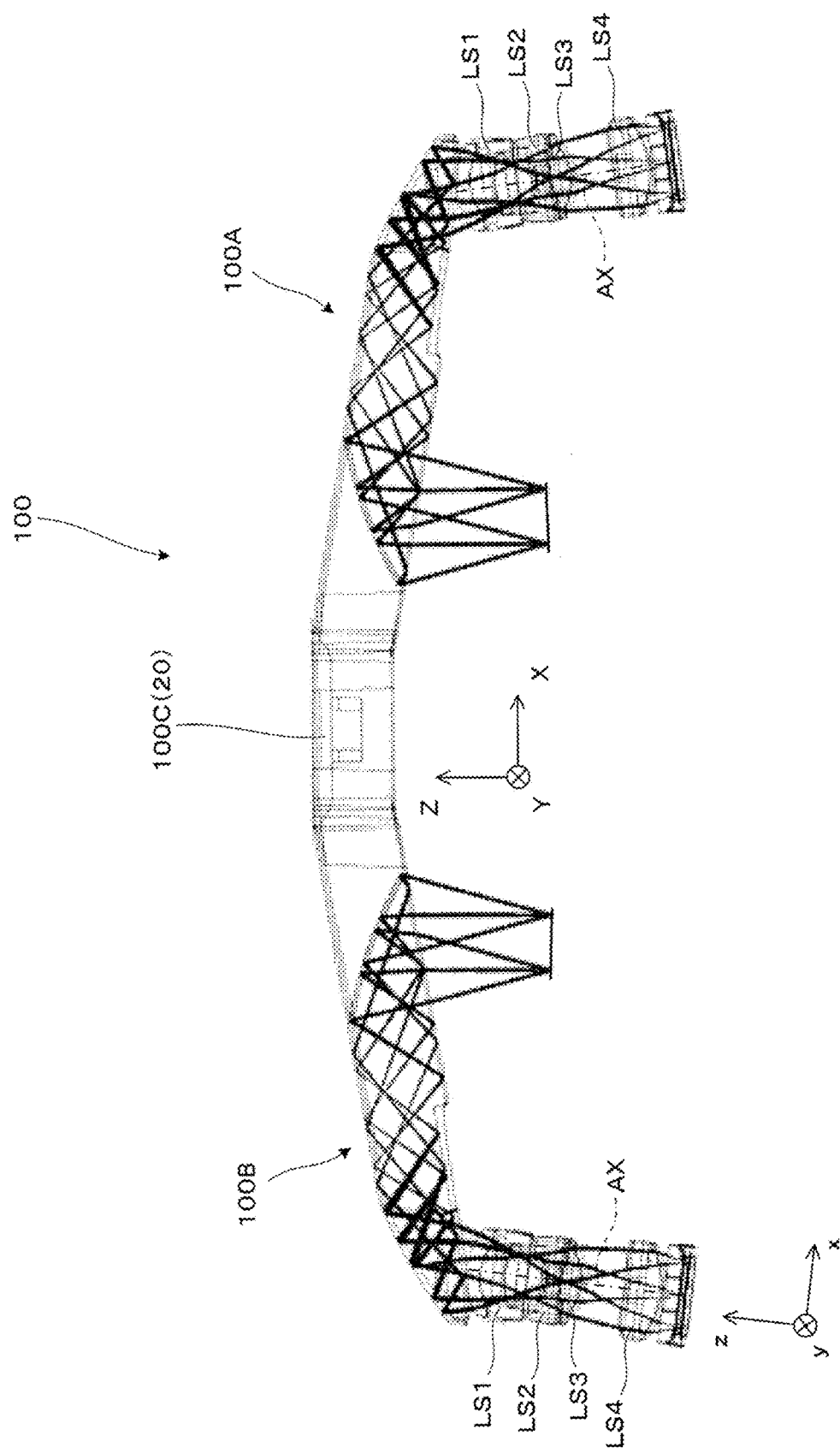
FIG. 3 is a conceptual plan view illustrating an optical path of image light.
Figure 4:
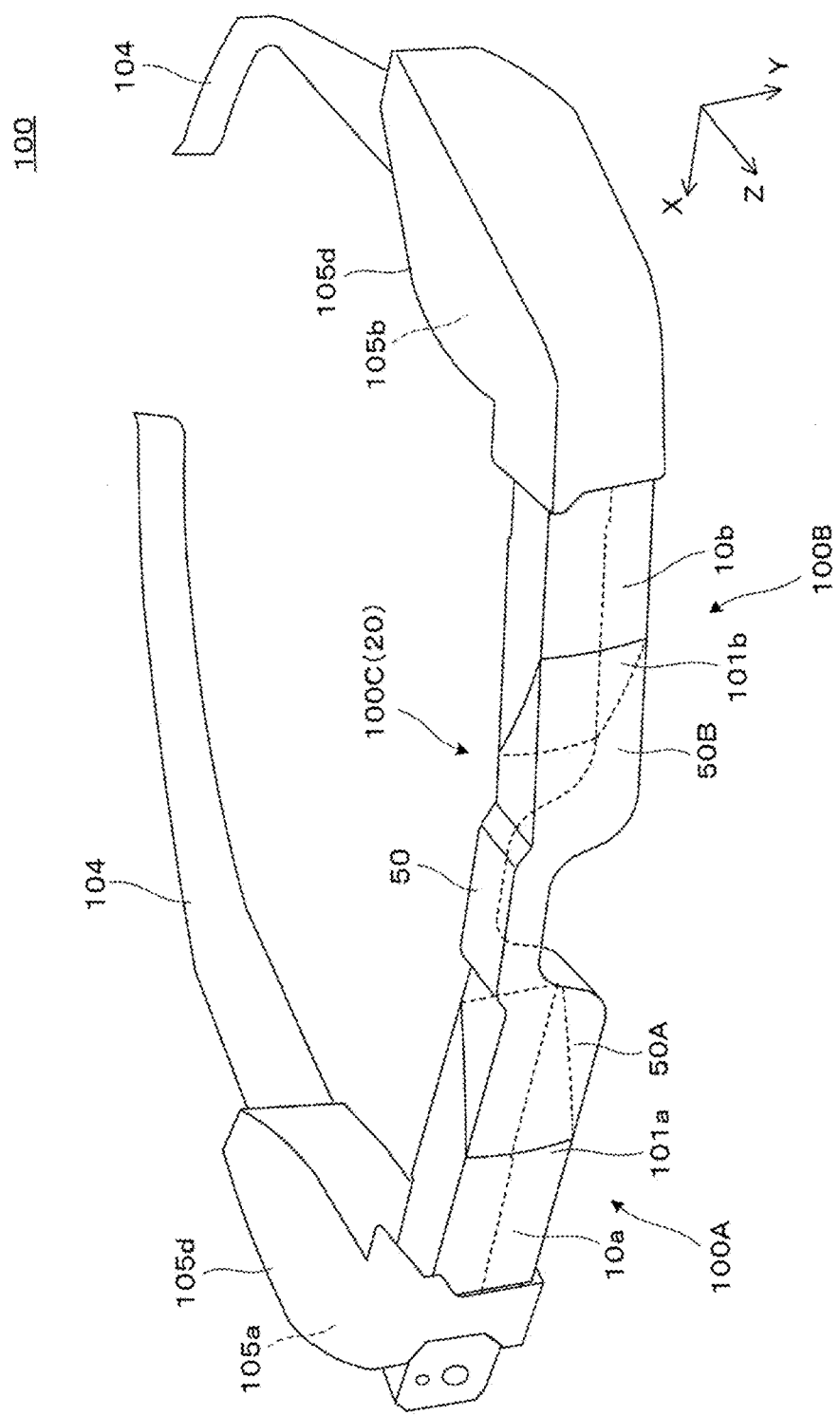
FIG. 4 is a perspective view illustrating a schematic example of the external appearance of the virtual image display apparatus.

A virtual image display apparatus according to an embodiment of the present disclosure will be described in detail below with reference to FIG. 1 and other figures. FIG. 1 is a perspective view illustrating an example of an optical system constituting a virtual image display apparatus 100 according to the present embodiment, where an outer packaging member has been removed. FIG. 2 illustrates, as another perspective view, a projection lens 30 housed in a lens barrel BR, where the lens barrel BR has been removed from the state illustrated in FIG. 1. FIG. 3 is a conceptual plan view of the optical path of image light GL in the virtual image display apparatus 100. FIG. 4 is a perspective view illustrating a simplified example of the external appearance of the virtual image display apparatus 100. Note that FIGS. 5 to 7 correspond to FIGS. 1 to 3 and are partially enlarged views of a portion for the left eye.

As illustrated in FIG. 1 and other figures, the virtual image display apparatus 100 is a head-mounted display (HMD) having the external appearance of eyeglasses. The virtual image display apparatus 100 can cause an observer or user wearing the virtual image display apparatus 100 to visually recognize imaging light (image light) as a virtual image and cause the observer to visually recognize or observe an image of the outside world in a see-through manner. The virtual image display apparatus 100 includes a first display apparatus 100A and a second display apparatus 100B. In FIG. 1 and the like, the reference symbols X, Y, and Z represent an orthogonal coordinate system. The ±X-direction corresponds to a lateral direction in which both eyes of the observer wearing the virtual image display apparatus 100 are aligned. The +Y-direction corresponds to a downward direction orthogonal to the lateral direction in which both eyes of the observer are aligned. The +Z-direction corresponds to a front direction with respect to the observer or a front surface direction.

The first display apparatus 100A and the second display apparatus 100B are portions that form a virtual image for the right eye and a virtual image for the left eye, respectively. The first display apparatus 100A for the right eye includes a first virtual image forming optical unit 101a that transparently covers the area in front of the eyes of the observer, and a first image forming body 105a that forms imaging light. The second display apparatus 100B for the left eye includes a second virtual image forming optical unit 101b that transparently covers the area in front of the eyes of the observer, and a second image forming body 105b that forms imaging light.

The first and second image forming bodies 105a and 105b are each constituted by an image element (display element) 80 that is an image forming device, optical systems such as the projection lens 30 for forming images, a case member CS that houses these optical systems, a lens barrel BR, and other components. Note that these components are supported and housed by being covered by a cover-shaped outer packaging member 105d (see FIG. 4).

The image element 80 may be an image display element configured of a self-light-emitting element such as an organic EL element. The image element 80 may be configured to include an image display element that is, for example, a transmission-type spatial light modulating device, as well as an illumination device as a backlight for emitting illumination light toward the image display element, and a driving control unit configured to control operation of the image element 80. Here, as illustrated and described above, the image element 80 is housed in and supported by the case member CS.

As illustrated in FIG. 3, for example, the projection lens 30 is a projection optical system including a plurality of optical elements (four lenses LS1 to LS4 in the examples illustrated in FIG. 2 and other figures) as constituent elements arranged along a direction (optical axis direction) in which an incident-side optical axis AX extends. Here, as illustrated and described above, the projection lens 30 is housed in and supported by the lens barrel BR, which is integrally formed with the projection lens 30 through, for example, resin molding. Note that the optical elements constituting the projection lens 30, that is, the four lenses LS1 to LS4 may include an aspheric lens including both an aspherical surface surface that is not axisymmetric and an aspheric surface that is axisymmetric. With this configuration, the optical elements can cooperate with optical surfaces or reflection surfaces of light-guiding members (light-guiding members 10, 10a, 10b) of the first and second virtual image forming optical units 101a and 101b described below to form intermediate images inside the light-guiding members.

Note that, if distinguishing between the right eye and the left eye in the following description, the image element 80 for the right eye may be described as an image element 80a and the image element 80 for the left eye may be described as an image element 80b. Similarly, the projection lens 30 may be described as a projection lens 30a or 30b, the case member CS may be described as a case member CSa or CSb, and the lens barrel BR may be described as a lens barrel BRa or BRb.

The first and second virtual image forming optical units 101a and 101b guide the image light formed by the first and second image forming bodies 105a and 105b and cause an observer to view the image light as external light and image light that are superimposed. In the examples illustrated in FIG. 1 and other figures, the first and second virtual image forming optical units 101a and 101b form a see-through light-guiding unit 100C as a member in which the first and second virtual image forming optical units 101a and 101b are linked at the center and integral rather than being separate bodies. The see-through light-guiding unit 100C is a composite-type light-guiding device that provides images for both eyes to an observer by guiding light. As a variation on the above, the see-through light-guiding unit 100C includes a pair of light-guiding members 10a and 10b and a central member 50 that is a light-transmitting member. The first virtual image forming optical unit 101a is formed of the light-guiding member 10a and a light-transmitting unit 50A corresponding to the right half of the central member 50. Similarly, the second virtual image forming optical unit 101b is formed of the light-guiding member 10b and a light-transmitting unit 50B corresponding to the left half of the central member 50. Note that the light-guiding members 10a and 10b may also be collectively referred to as "light-guiding member 10".

As seen from the exemplary external appearance illustrated in FIG. 4, the see-through light-guiding unit 100C of the virtual image display apparatus 100 is supported by the cover-shaped outer packaging member 105d at both ends, for example. Furthermore, arms 104 are rotatably attached to the outer packaging members 105d using, for example, a hinge (not illustrated). The arms 104 are portions extending rearward from ends of the left and right outer packaging members 105d. As described above, the virtual image display apparatus 100 has such an external appearance and ensures a wearing state by causing each of the above-described portions to abut with an observer's ear, temple, or the like.

Figure 5:
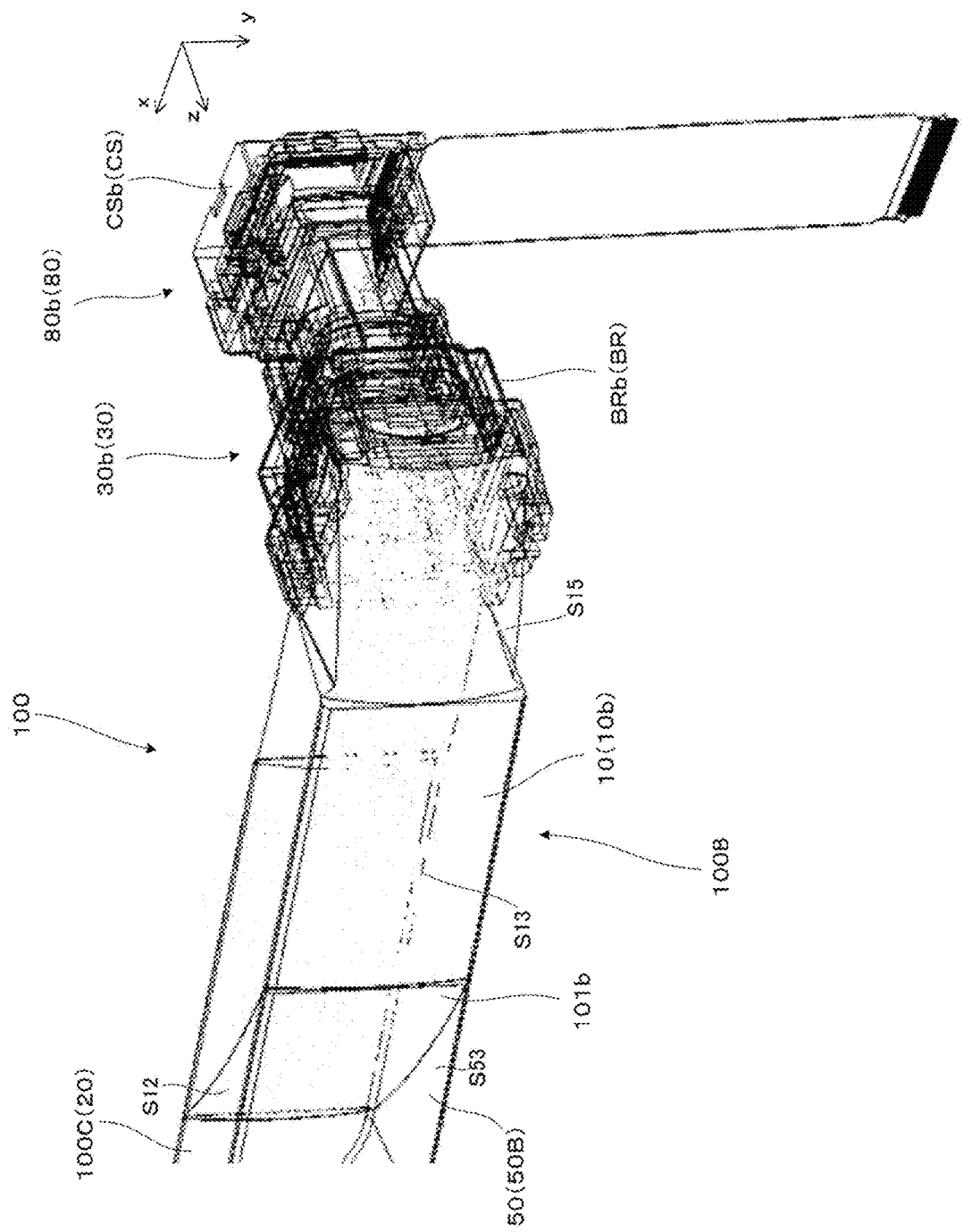
FIG. 5 is an enlarged perspective view of a portion of FIG. 1.
Figure 6:
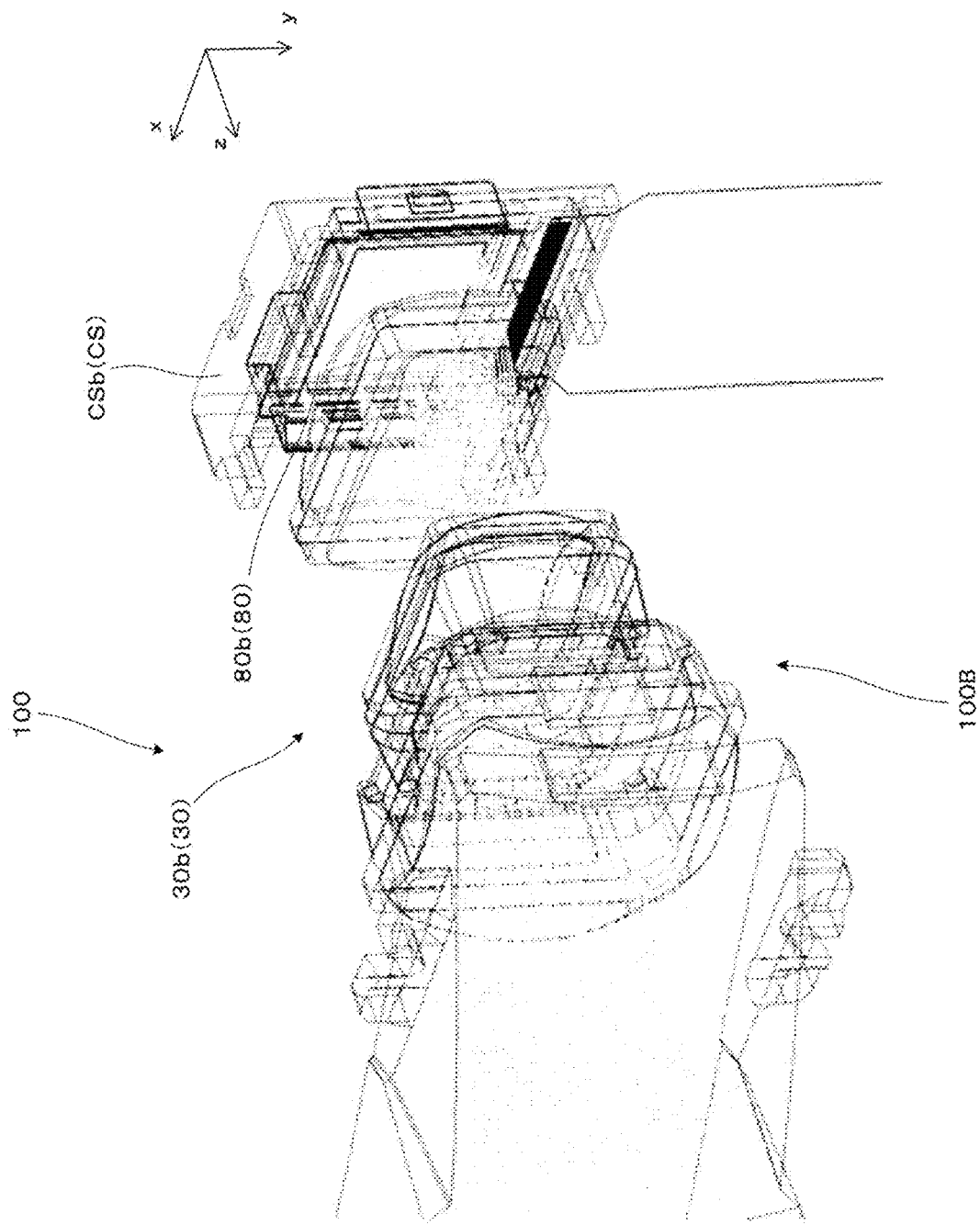
FIG. 6 is an enlarged perspective view of a portion of FIG. 2.
Figure 7:
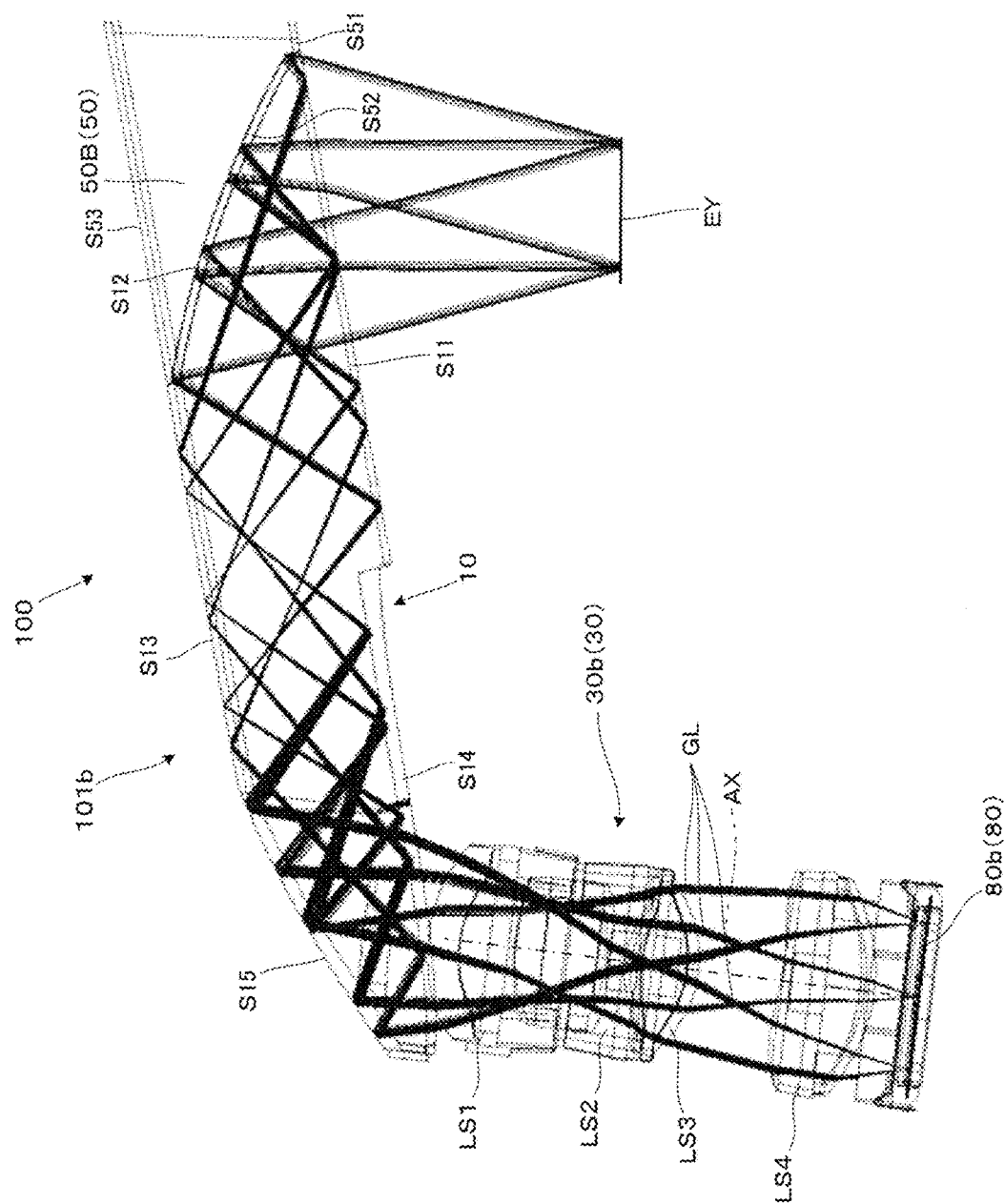
FIG. 7 is a conceptual plan view of the optical path of image light for the left eye in FIG. 3.

An exemplary structure and the like that allows the virtual image display apparatus 100 to guide the image light GL will be conceptually described below with reference to FIG. 5 and other figures. As described above, the virtual image display apparatus 100 is made up of the first display apparatus 100A and the second display apparatus 100B (see FIGS. 1 to 3), and the first display apparatus 100A and the second display apparatus 100B have left-right symmetrical and equivalent structures. Therefore, only the second display apparatus 100B is illustrated in FIGS. 5 to 7 respectively corresponding to FIGS. 1 to 3, only the second display apparatus 100B will be described, and a description of the first display apparatus 100A will be omitted. Note that, as described above, FIGS. 5 to 7 are partially enlarged views of locations constituting the portions for the left eye in FIGS. 1 to 3, where portions of the optical system in particular have been extracted. In FIG. 5 and other figures, the reference symbols x, y and z represent an orthogonal coordinate system. The z-direction corresponds to the optical axis direction of the optical system constituting the second display apparatus 100B. The x- and y-directions correspond to in-plane directions within the panel plane of the image element 80b (80) with the z-direction as the normal direction. Further, the x-direction corresponds to a horizontal direction, and the y-direction corresponds to a vertical direction.

As described above, the second display apparatus 100B includes the image element (image display apparatus) 80b as an image forming device, the projection lens 30b as a projection optical system used for imaging, and the second virtual image forming optical unit 101b that guides the image light GL that has passed through the image element 80b and the projection lens 30b. These components are optical members that form and guide the image light GL. Note that, as described above, the second virtual image forming optical unit 101b is constituted by the light-guiding member 10b for guiding light and providing transparency and the see-through light-transmitting portion 50B that is a part of the central member 50.

Figure 8:
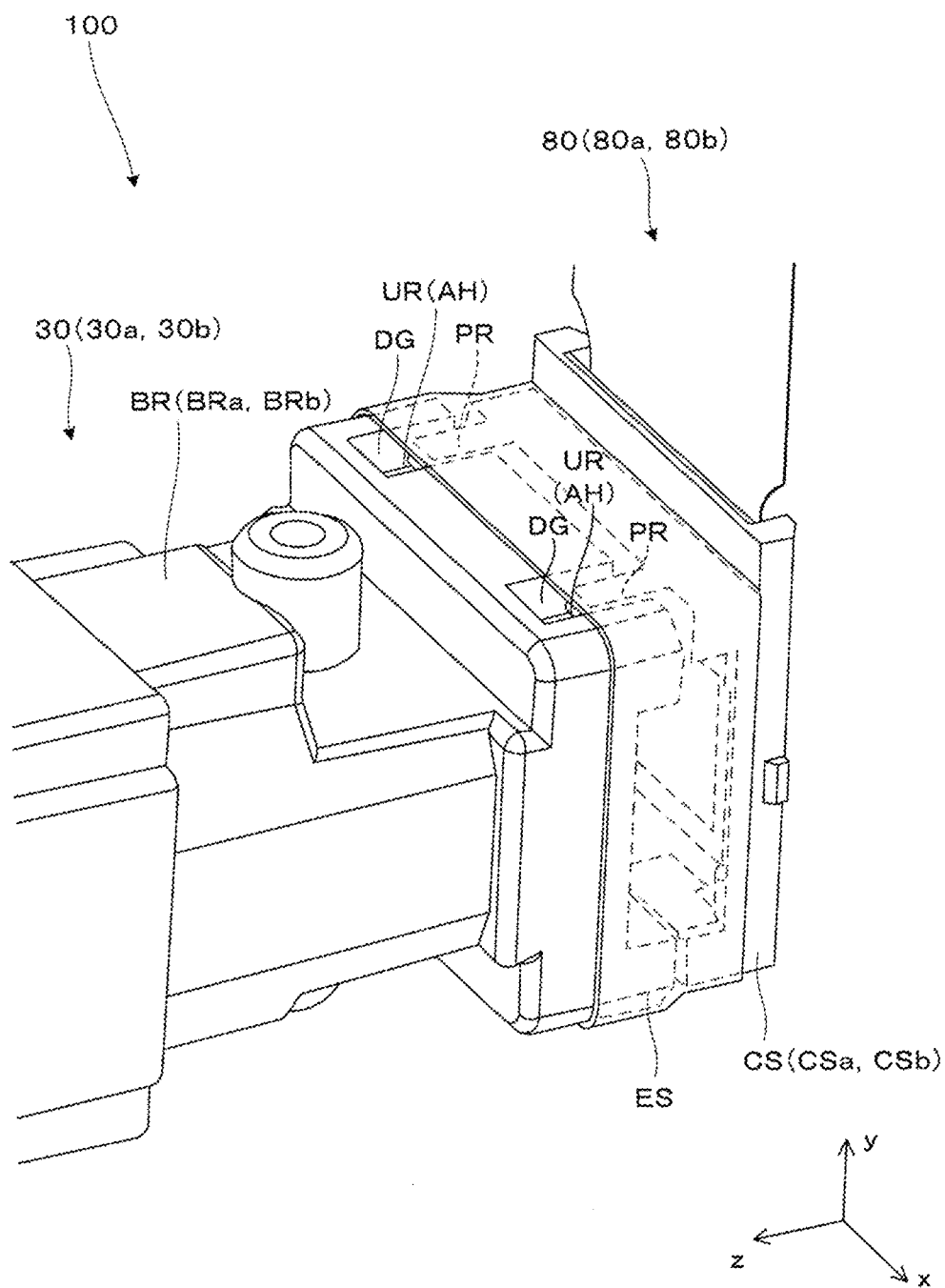
FIG. 8 is a partially enlarged perspective view illustrating an example of a mounting structure for a display apparatus.

The image element 80b is housed in the case member CSb and the projection lens 30b is housed in the lens barrel BRb. Further, as illustrated in FIG. 8, space between the case member CSb and the lens barrel BRb is covered by an elastic sealing member ES. With this configuration, a sealed state is maintained when adjusting the position between the case member CSb and the lens barrel BRb, that is, when adjusting the position between the image element 80b housed in the case member CSb and the projection lens 30b housed in the lens barrel BRb. Thus, debris and the like can be prevented from entering the components. In other words, because the sealing member ES is elastic, a space including a range occupied by the optical path of the image light from the case member CSb to the lens barrel BRb is formed, and the area around the space is completely surrounded when the position is adjusted. These components function as an intrusion prevention cover that prevents debris from entering the lens barrel BRb and other components.

Returning to FIG. 5 and other figures, the image element 80b, which is an image forming device, has a rectangular shape and forms a rectangular image plane. The image element 80b emits the image light GL from various positions on the image plane. Here, the normal direction of the image plane is the z-direction. In other words, the z-direction corresponds to the optical axis direction in which the optical axis of the projection lens 30 extends. One direction of the rectangular image plane or the image element 80b of the in-plane direction of the image plane perpendicular to the z-direction corresponds to the x-direction. Thus, with respect to the in-plane direction of the image plane, the direction perpendicular to the x-direction is the y-direction. Note that, here, the longitudinal direction of the rectangular shape is the x-direction.

The projection lens 30b emits the image light GL that has passed through the four lenses LS1 to LS4 arranged along the incident-side optical axis AX toward the light-guiding member 10b constituting the second virtual image forming optical unit 101b.

The second virtual image forming optical unit 101b guides the image light GL emitted from the projection lens 30b. Therefore, as described above, the second virtual image forming optical unit 101b is made up of the light-guiding member 10b used for guiding light and providing transparency and the see-through light-transmitting portion 50B. In addition, the body portion of the second virtual image forming optical unit 101b is covered and protected by a hard coat layer provided on a front surface portion of the second virtual image forming optical unit 101b as a protective layer. The second virtual image forming optical unit 101b is precisely positioned and fixed with respect to the projection lens 30 by being screwed to an optical component holding member such as the lens barrel BRb.

Now, the configuration used for guiding the image light GL in the second virtual image forming optical unit 101b will be described in detail. First, as illustrated in FIG. 7, the light-guiding member 10b of the second virtual image forming optical unit 101b includes first to fifth surfaces S11 to S15 as side surfaces having an optical function. Of these surfaces, the first surface S11 and the fourth surface S14 are adjacent, and the third surface S13 and the fifth surface S15 are adjacent. Further, the second surface S12 is disposed between the first surface S11 and the third surface S13. A half mirror layer is attached to the surface of the second surface S12. The half mirror layer is a reflective film having light transmissivity, (a semi-transmissive reflective film) that is formed by depositing a metallic reflective film or a dielectric multilayer film, and is provided with appropriate reflectivity with respect to the image light. Specifically, the light-guiding member 10b has a transmissive reflective surface that covers the area in front of the eyes when worn by the observer.

Of the members constituting the second virtual image forming optical unit 101b, the light-transmitting portion 50B is a member (assistance optical block) that assists the see-through function of the light-guiding member 10b and corresponds to one second virtual image forming optical unit 101b integrally secured with the light-guiding member 10b. The light-transmitting portion 50B has a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on a plane along which the first surface S11 of the light-guiding member 10b extends. The second transmission surface S52 is a curved surface that is bonded to and integrated with the second surface S12. The third transmission surface S53 is on a plane along which the third surface S13 of the light-guiding member 10b extends. In other words, the first surface S11 and the first transmission surface S51 are adjacent to each other, and similarly, the third surface S13 and the third transmission surface S53 are adjacent to each other, and both are aligned to be flush with each other and form a smooth surface.

An outline of the optical path of the image light GL in the second virtual image forming optical unit 101b will be described below with reference to FIG. 7. The light-guiding member 10b causes the image light GL from the projection lens 30 to be incident, that is, receives the image light GL and guides the image light GL toward an eye EY of the observer by reflecting the image light GL off the first to fifth surfaces S11 to S15, for example. Specifically, the image light GL emitted from the projection lens 30 is first incident on the fourth surface S14 and reflected by the fifth surface S15, is incident again on the fourth surface S14 from the inner side and totally reflected, is incident on and totally reflected by the third surface S13, and is incident on and totally reflected by the first surface S11. The image light GL totally reflected by the first surface S11 is incident on the second surface S12, is partially reflected while partially passing through the half mirror layer provided on the second surface S12, and is once more incident on and passes through the first surface S11. The image light GL that has passed through the first surface S11 is incident as a substantially parallel light flux on the eye EY of the observer or at an equivalent position. In other words, the observer observes the image formed by the image light GL as the virtual image.

As described above, the second virtual image forming optical unit 101b causes the observer to visually recognize the image light using the light-guiding member 10b and causes the light-guiding member 10b and the light-transmitting member 50B to cooperate such that the observer observes an image of the outside world with little distortion. At this time, since the third surface S13 and the first surface S11 are substantially parallel to each other (diopter is approximately 0), almost no aberration or the like occurs in the external world light. Further, similarly, the third transmission surface S53 and the first transmission surface S51 are planes that are substantially parallel to each other. Furthermore, since the third transmission surface S53 and the first surface S11 are planes that are substantially parallel to each other, almost no aberration or the like occurs. As described above, the observer observes an image of the outside world with no distortion through the central member 50 as a light-transmitting member.

As described above, in the present embodiment, the image light emitted from the image element 80b is guided inside the light-guiding member 10b by being reflected five times from the first surface S11 to the fifth surface S15, including being totally reflected at least two times. As a result, both the display of the image light and the see-through perspective that causes the external world light to be visually recognized can be achieved, and aberration correction of the image light GL can be performed.

The configuration described above also applies to the first display device 100A (see FIG. 1). With this configuration, it possible to form images corresponding to the left and right eyes, respectively.

Here, during a manufacturing step of configuring the optical system that forms images as described above, positioning of the optical systems is very important. In particular, in the case of a configuration including the first display apparatus 100A and the second display apparatus 100B and in which an image is visually recognized by the left and right eyes as in the virtual image display apparatus 100, positioning in consideration of the balance between the right eye side and the left eye side is more important than than simply positioning for only one eye. More specifically, after mounting the lens barrels BRa and BRb respectively housing the projection lenses 30a and 30b to the see-through light-guiding unit 100C, positioning accuracy when mounting the case members CSa and CSb housing the image elements 80a and 80b to the lens barrels BRa and BRb (panel adjustment step) is very important. In particular, if foreign material adheres to the components in this panel adjustment step, that foreign matter may enter through the front surface of the image element 80a, 80 b, which is the display portion, and, as a result, cause image deterioration.

In contrast, as illustrated in FIG. 8, in the virtual image display apparatus 100 according to the present embodiment, the space between the case member CS (CSa, CSb) housing the image element 80 (80a, 80b) and the lens barrel BR (BRa, BRb) housing the projection lens 30 (30a, 30b) is covered by the elastic sealing member ES. With this virtual image display apparatus 100, the position of the image element 80 housed in the case member CS can be adjusted while being sealed with the elastic sealing member ES, and assembly can be performed thereafter. Thus, foreign material can be prevented from entering during these operations.

The sealing member ES is a transparent tape-shaped member including an adhesive portion. In other words, the sealing member ES is a transparent member that has ultraviolet transmittance and is formed into a tape shape having an adhesive portion so as to be affixed by being wrapped around the image element 80 and the projection lens 30. For example, a tape having adhesiveness in the tape itself may be used as the sealing member ES. This type of tape is referred to as substrate-less tape. Note that when a substrate-less tape is used, the tape is adhesive to itself, and therefore, after sealing, the tape will also have the effect of sticking to debris generated inside.

In the illustrated examples, an excavated portion DG is formed on a side surface of the lens barrel BR and a protruding portion PR corresponding to the excavated portion DG is provided on a side surface of the case member CS. When the lens barrel BR and the case member CS are joined together, these members are fitted into each other and the sealing member ES is wound between the lens barrel BR and the case member CS. Further, an adhesive AH serving as an ultraviolet light curable resin UR is applied to the excavated portion DG, the projection PR, and other members. As a result, the relative positional relationship between the lens barrel BR and the case member CS can be adjusted while the space between the lens barrel BR and the case member CS is hermetically sealed. Note that a suitable margin (for example, approximately 0.6 mm on one side in the ±y-direction) is provided between each of the excavated portions DG and the corresponding protruding portions PR such that the position can be adjusted after these members are fitted into each other.

In the state described above, after the position has been adjusted, the adhesive AH is irradiated with ultraviolet light through the sealing member ES to be cured and form an ultraviolet light curing resin UR (or a fixing portion UR formed of an ultraviolet light curing resin) to thereby position and fix the components. In other words, the case member CS and the lens barrel BR are bonded or fixed using the ultraviolet light curing resin UR.

Note that various types of sealing members ES may be used, but an adhesive transfer tape without a substrate using an acrylic adhesive, for example, may be adopted. With this configuration, the tape has necessary ultraviolet transmittance and elasticity that satisfies displacement required for position adjustment. Further, stress generated due to expansion/contraction of the tape can be suppressed to a degree having no effect after positioning and fixing in the panel adjustment step. In addition, with this configuration, the sealing member ES has high adhesive strength and excellent shear holding power, and is suitable for permanent adhesive applications.

Figure 9:
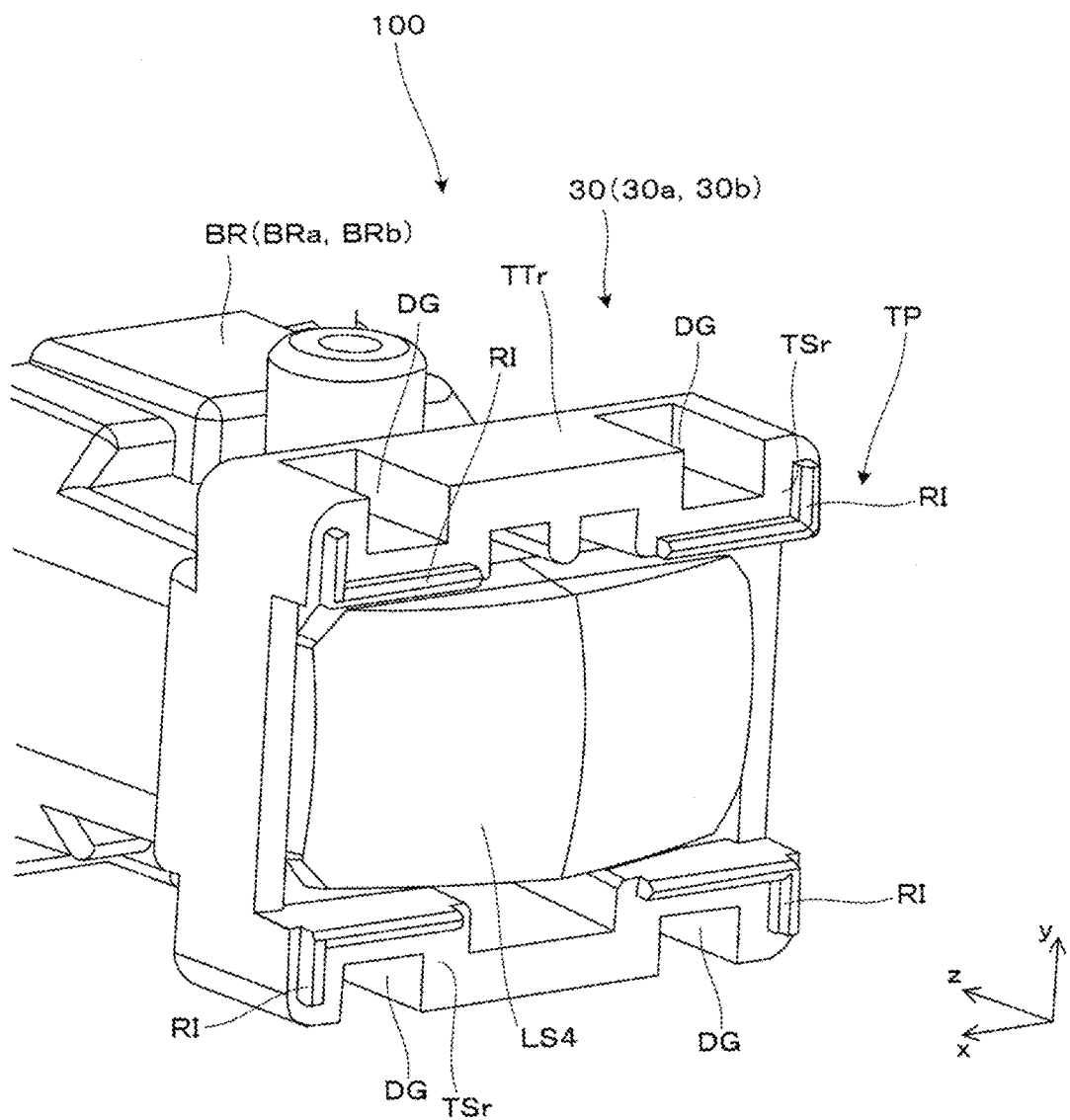
FIG. 9 is a partially enlarged perspective view illustrating an example of a lens barrel housing a projection optical system.
Figure 10:
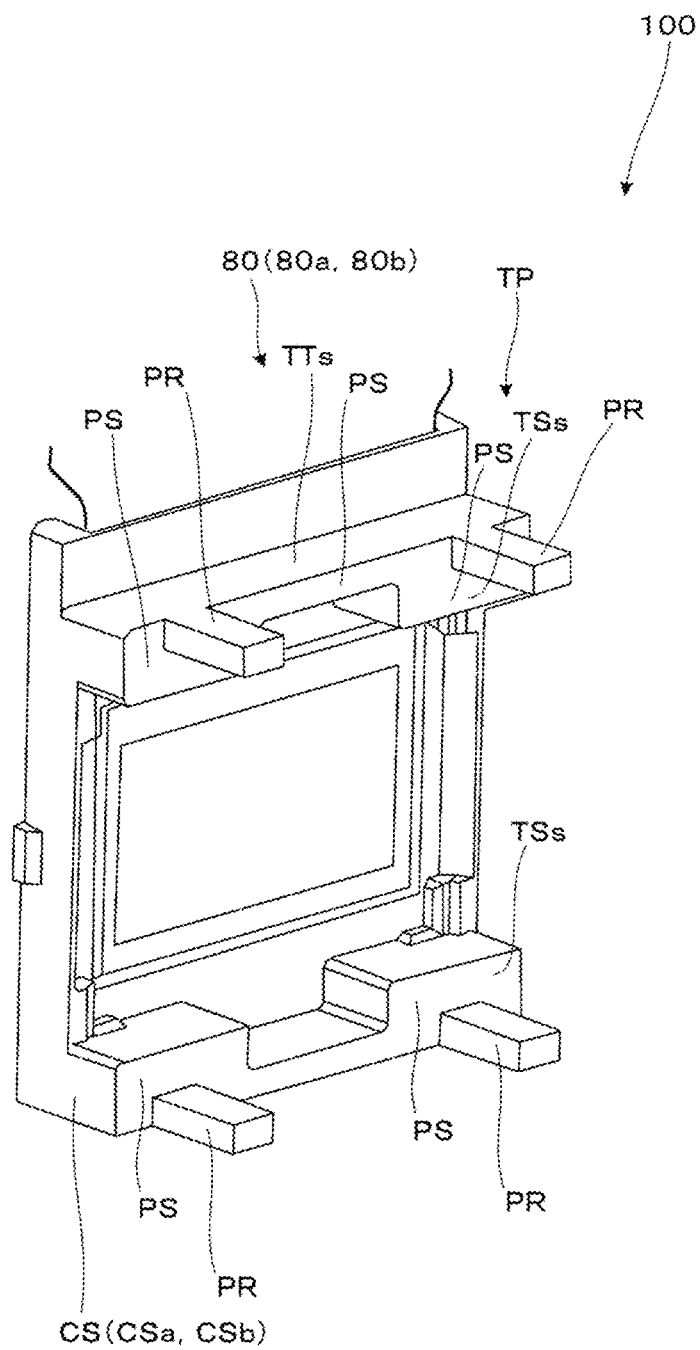
FIG. 10 is a partially enlarged perspective view illustrating an example of a case member housing an image element.

Now, an exemplary structure relating to the above-described sealed portion will be described below with reference to FIG. 9 and other figures. FIG. 9 is a partially enlarged perspective view illustrating an example of the lens barrel BR housing the projection lens 30. FIG. 9 depicts a side on which the lens barrel BR is coupled to the case member CS illustrated in FIG. 8 and other figures. FIG. 10 is a partially enlarged perspective view illustrating an example of the case member CS housing the image element 80. FIG. 10 depicts a side on which the case member CS is coupled to the lens barrel BR illustrated in FIG. 8 and other figures.

First, as illustrated in FIG. 9, the lens barrel BR includes excavated portions DG on a side surface of an end portion TTr coupled to the case member CS (see FIG. 10). The excavated portions DG extend along the z-direction, which is the direction in which the incident-side optical axis AX (see FIG. 7 and the like) of the projection lens 30 extends. Furthermore, ribs RI used for temporary positioning when attaching the sealing member ES (see FIG. 8) are formed on an end face TSr of the end portion TTr. As illustrated in the drawings, the ribs RI are L-shaped protruding portions provided at the four corners of the end face TSr.

On the other hand, as illustrated in FIG. 10, the case member CS includes protruding portions PR corresponding to the excavated portions DG (see FIG. 9) at an end portion TTs on the side coupled to the lens barrel BR (see FIG. 9). As with the excavated portions DG, the protruding portions PR extend along the z-direction. Furthermore, fitting portions PS each having an outline shape corresponding to the L-shaped rib RI (see FIG. 9) are provided on the end face TSs of the end portion TTs. In other words, when the ribs RI and the fitting portions PS cooperate, these members function as a temporary positioning portion TP that temporarily positions the case member CS and the lens barrel BR in contact with each other when the sealing member ES is attached to the case member CS and the lens barrel BR.

A more detailed example of the positioning between the case member CS and the lens barrel BR will be described below with reference to FIG. 11 and other figures.

Figure 11:
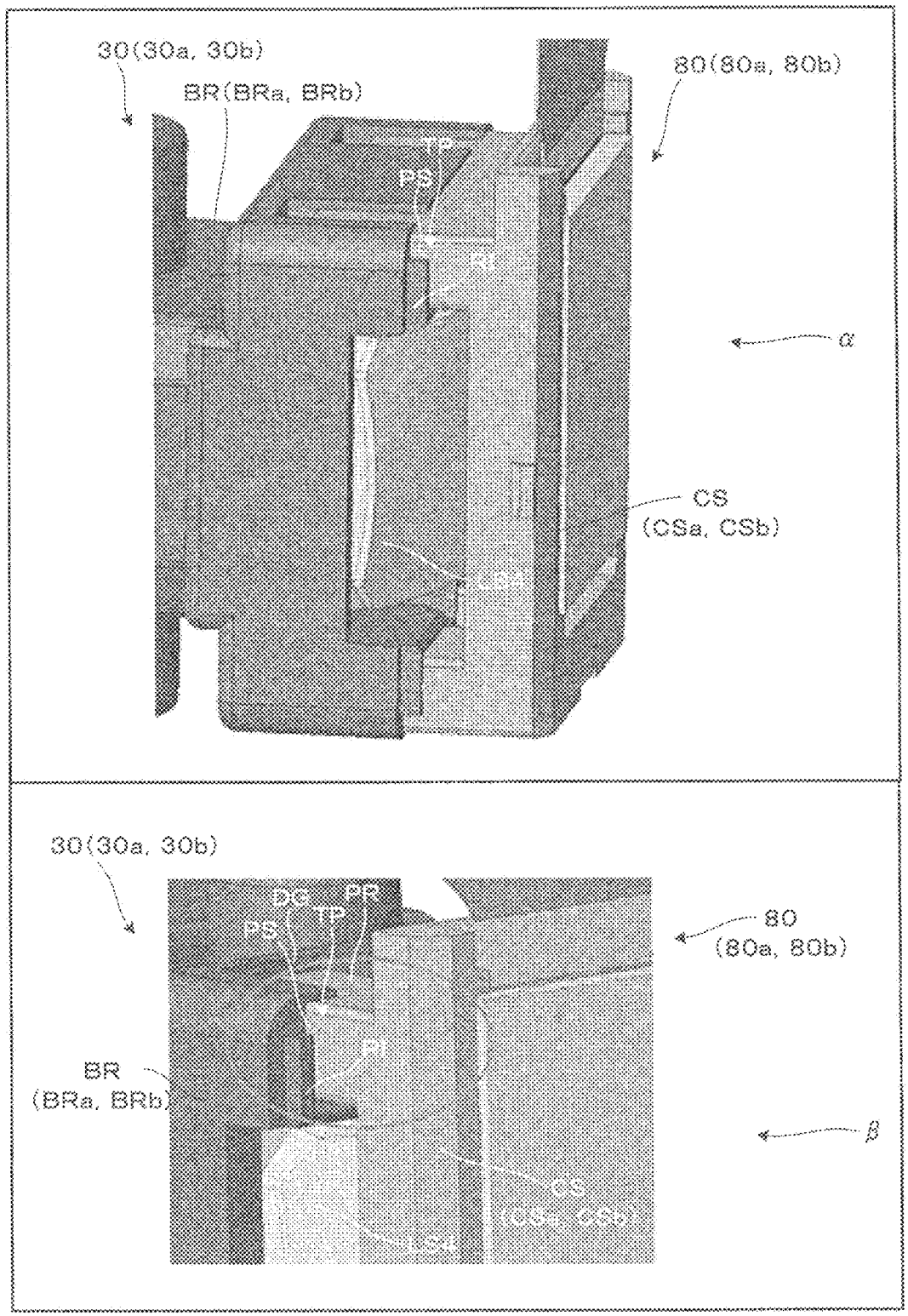
FIG. 11 is a perspective view illustrating temporary positioning between the case member and the lens barrel.

FIG. 11 is a perspective view illustrating positioning using the temporary positioning portion TP for attaching the sealing member ES and other components as an example of temporary positioning between the lens barrel BR and the case member CS, that is, the stage before official positioning.

As illustrated in the drawings and described above, temporary positioning is performed with the temporary positioning portion TP constituted of the rib RI and the fitting portion PS. Specifically, as illustrated in a state α and a state R, which is a partially enlarged view of the state α, in FIG. 11, the rib RI of the lens barrel BR is fitted into the fitting portion PS of the case member CS to perform temporary positioning. Then, the sealing member ES is wound around the components in this state (see, for example, FIG. 8). Furthermore, the ultraviolet light curing resin UR is filled into, for example, the gap between the excavated portion DG and the protruding portion PR before the sealing member ES is wound or after the sealing member ES is wound. Here, as an example, the ultraviolet curable resin UR is first applied between the excavated portion DG and the protruding portion PR, after which the sealing member ES is wound to create a state where the sealing member ES at least partly covers the ultraviolet-curable resin UR.

Figure 12:
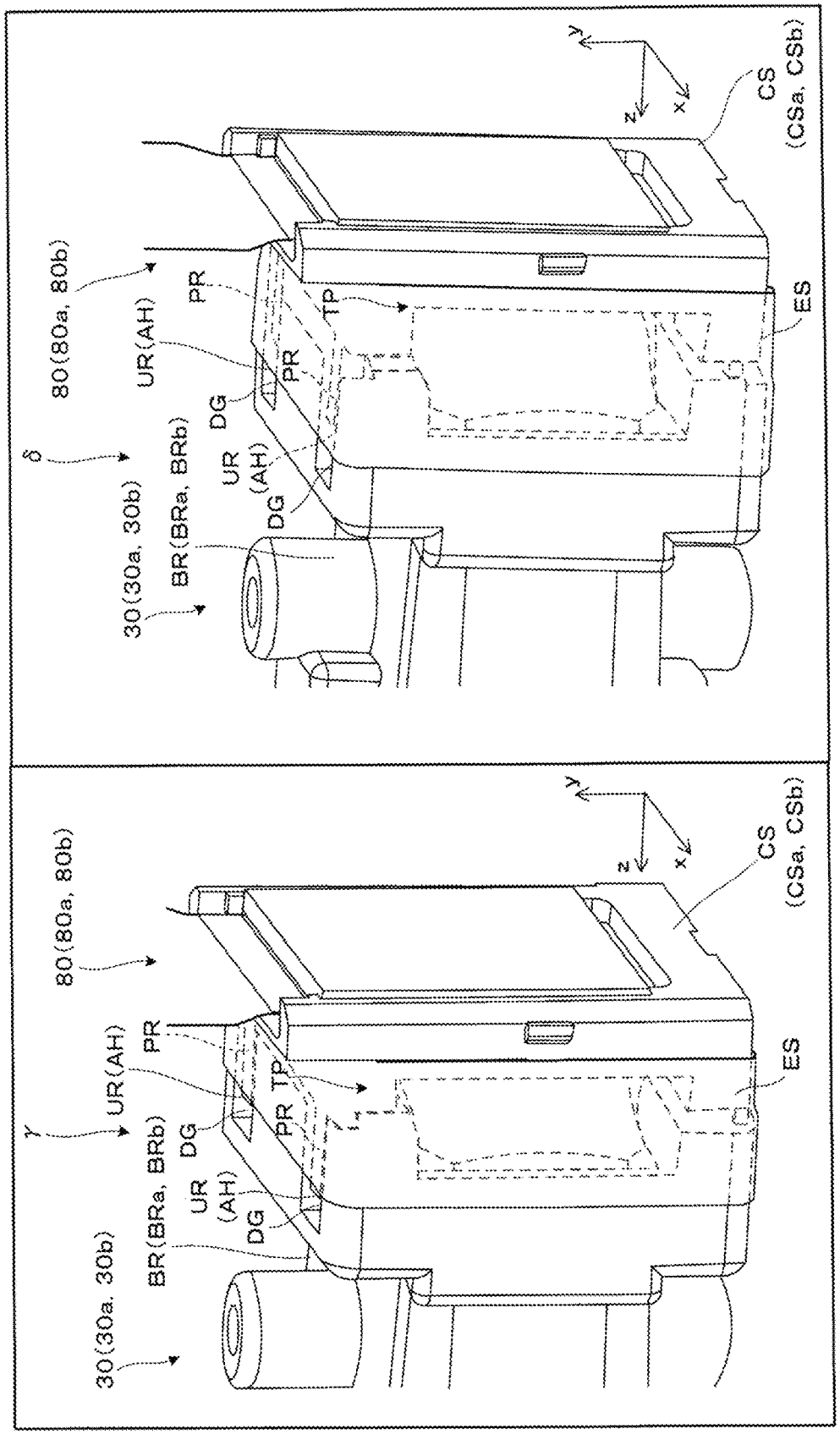
FIG. 12 is a perspective view illustrating an example of position adjustment states.

As described above and as illustrated in FIG. 12 as a state γ, for example, the sealing member ES alone or through cooperation between the sealing member ES and the ultraviolet light curing resin UR (or an adhesive AH serving as the ultraviolet light curing resin UR) creates a state where the relative positional relationship between the lens barrel BR and the case member CS can be adjusted while the space between the lens barrel BR and the case member CS is hermetically sealed. Specifically, the sealing member ES or the like maintains this hermetic state during the temporary positioning as described above, and the lens barrel BR is fixed using a jig (not illustrated). Further, the case member CS is moved in the x-direction and the y-direction, that is, in the in-plane direction of the image element 80, and the position can be precisely adjusted by moving the case member CS in the z-direction or the optical axis direction. At this time, the position can be adjusted over the ribs RI if, for example, the ribs RI are formed sufficiently low (for example, approximately 0.1 mm high). Further, in addition to adjustment in the x-, y- and z-directions, inclination and the like can also be adjusted. In other words, adjustment in six axial directions may be possible.

After the position is determined through adjustment as described above, the case member CS and the lens barrel BR are fixed by being irradiated through the sealing member ES with ultraviolet light to cure the ultraviolet light curing resin UR. As illustrated in the state δ, the positional relationship between the case member CS and the lens barrel BR, that is, the positional relationship between the image element 80 and the projection lens 30 is fixed in a desired state.

Figure 13:
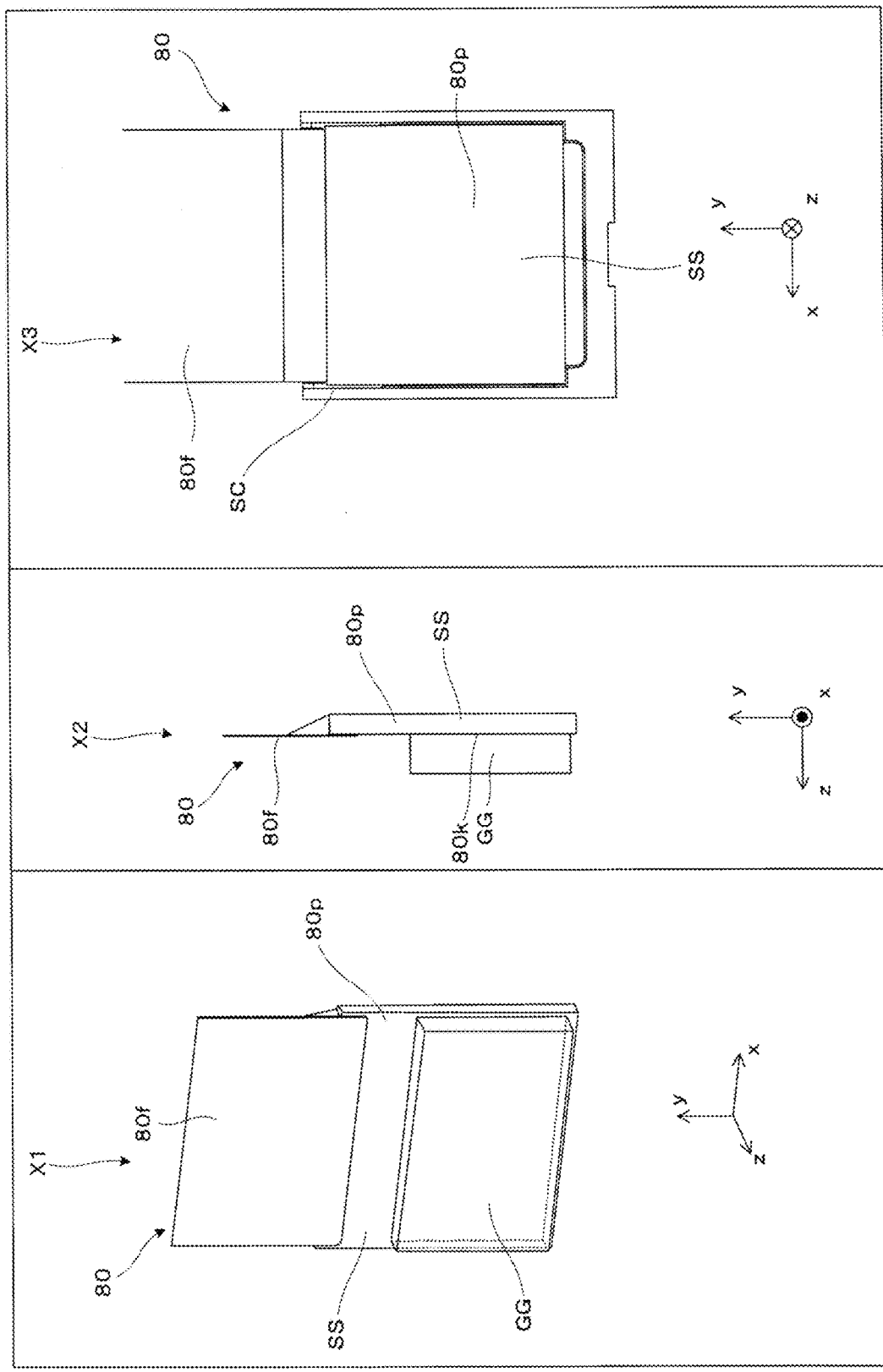
FIG. 13 is a conceptual diagram illustrating an example of the structure of the image element and an example of assembling the image element to the case member.
Figure 14:
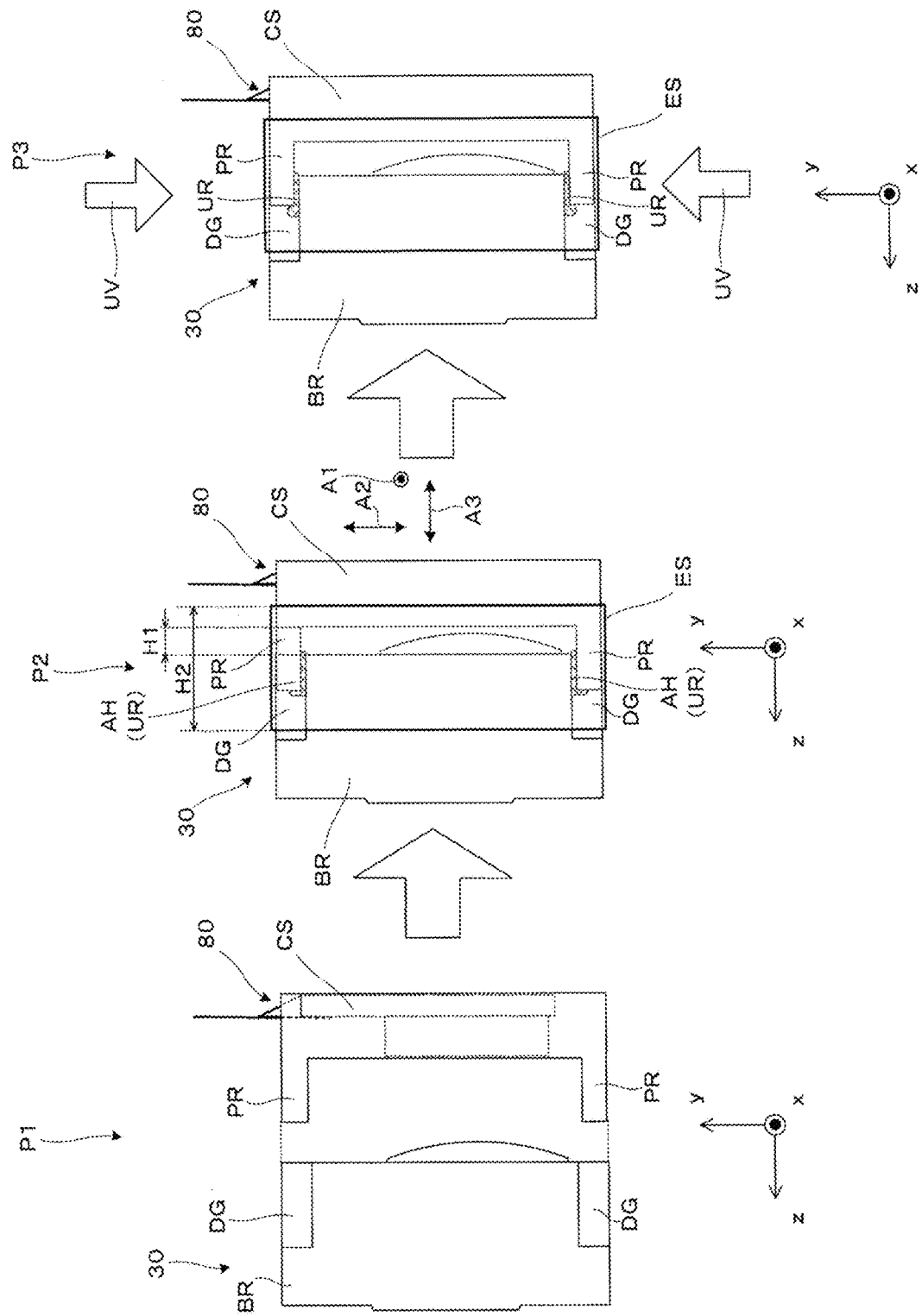
FIG. 14 is a conceptual diagram illustrating an example of an assembly step.

Referring now to FIGS. 13 and 14, exemplary steps of the manufacturing described above will be described. First, an exemplary structure of the image element 80 and the incorporation of the image element 80 into the case member CS will be described with reference to the conceptual drawing of FIG. 13, noting that FIG. 13 is a diagram illustrating manufacturing steps related to position adjustment. In the drawings, the state X1 illustrates an example of the image element 80 in perspective view and the state X2 illustrates an example of the image element 80 in side view. The state X3 illustrates a state in which the image element 80 is housed in the case member CS.

As illustrated in the drawings, the image element 80 includes a rectangular plate-shaped body portion 80p housed in the case member CS and a flexible printed circuit (FPC) portion 80f coupled to and extending from the body portion 80p. Of these components, the body portion 80p includes a silicon substrate SS disposed with various circuits and the like and constituting the outer shape of the body portion 80p, a light emitting portion 80k that is an organic EL element including an organic EL material and configured to generate colored light to be used as the image light, and a protective glass GG for sealing that cooperates with the silicon substrate SS to seal the light emitting portion 80k. The image element 80 emits the image light toward the side of the protective glass GG, or the +z-side, by performing a light emitting operation in accordance with a drive signal received from the FPC portion 80f. As illustrated in the state X3, the case member CS supports and fixes the image element 80 while providing a heat dissipation structure portion. The heat dissipation structure portion creates a state where part of image element 80 is open and exposed on a side opposite to the side on which the image light is emitted. With this configuration, by providing the heat-dissipating portion at a portion of the rear side of the silicon substrate SS exposed from the case member CS, for example, heat dissipation of the image element 80 can be promoted.

Referring to the conceptual drawing of FIG. 14, an exemplary assembly step of assembling the case member CS housing the image element 80 to the lens barrel BR housing the projection lens 30 as illustrated in FIG. 13 will be described below. First, as illustrated in a step P1, the case member CS and the lens barrel BR to be assembled are prepared (preparation step). For example, the lens barrel BR side is fixed by a jig (not shown) or other component, and the case member CS is mounted on the jig (not shown) such that the position of the case member CS can be adjusted. Note that, as illustrated in a step P2, the position of the case member CS can be adjusted in the directions indicated by the three bidirectional arrows A1 to A3 corresponding to the x-direction, the y-direction and the z-direction. The rotational posture of the case member CS can also be adjusted so that the position can be adjusted in six axial directions. Next, as illustrated in the step P2, while the case member CS and the lens barrel BR are temporarily positioned (temporary positioning step), the space between the excavated portion DG of the lens barrel BR and the protruding portion PR of the case member CS corresponding to the excavated portion DG is filled with the adhesive AH (filling step). Then, the elastic sealing member ES is wound and the case member CS and the lens barrel BR are brought into a sealed state (sealing step). Note that the sealing member ES is wound without any gaps and without any extra tension. The size of a gap CL between the case member CS and the lens barrel BR, that is, a width H1 of the gap CL in the drawings, may be, for example, greater than or equal to 2 mm less than a width H2 of the sealing member ES. In this case, it is possible to ensure a width of at least 1 mm or greater with respect to both the case member CS and the lens barrel BR for bonding the sealing member ES. Thus, it is possible to ensure a sufficient adhesion state even when the case member CS is adjusted in the sealed state as described above, that is, even when the position of the panel is adjusted.

In the situation described above, positional adjustment is performed in the directions of the three bidirectional arrows A1 to A3, and further for three types of axial rotation with the three bidirectional arrows A1 to A3 as the axial directions (panel position adjustment step). In particular, as in the present disclosure, when a pair of configurations is used for the left and right eyes, other positions can be adjusted based on one adjustment position. Once the adjustment position has been established, the adhesive AH is irradiated with the ultraviolet light UV from the outer side (e.g. from the side) of the transparent (ultraviolet transmissive) sealing member ES, as illustrated in the step P3. The ultraviolet light UV passes through the sealing member ES and irradiates the adhesive AH to cure the adhesive AH and form the ultraviolet light curing resin UR. The relative positional relationship between the case member CS and the lens barrel BR is fixed by the ultraviolet light curing resin UR (this positioning step).

As described above, the virtual image display apparatus 100 according to the present embodiment includes the case member CS that houses the image element 80, the lens barrel BR that houses the projection lens 30, which is an optical system that causes the image light GL emitted from the image element 80 to be incident, that is, receives the image light GL, and the elastic sealing member ES that covers the space between the case member CS and the lens barrel BR. Thus, in the virtual image display apparatus 100, the case member CS and the lens barrel BR are sealed using the elastic sealing member ES. In this state, the case member CS and the lens barrel BR can be assembled after the position between the image element 80 housed in the case member CS and the projection lens 30 as the optical system housed in the lens barrel BR has been adjusted. Thus, foreign matter can be prevented from entering during these operations.

Other

Thus far, the invention has been described based on some exemplary embodiments. Note that, however, the invention is not limited to the above-described exemplary embodiments, and can be embodied in various aspects without departing from the spirit and scope of the invention.

In the above description, providing the case member CS, the lens barrel BR and the sealing member ES in both the first display apparatus 100A and the second display apparatus 100B provided for the left and right eyes, for example, allows the positions of each component to be adjusted. By adopting the structure described above in at least one of the first display apparatus 100A and the second display apparatus 100B, one apparatus can be adjusted (positioned) with respect to the other and debris can be prevented from entering the apparatuses during adjustment.

In the above description, the sealing member ES is made of a transparent member so as to have ultraviolet transmittance. However, if, for example, a fixing portion corresponding to the ultraviolet light curing resin UR can be formed using a different method without performing ultraviolet irradiation through the sealing member ES, the sealing member ES may not be transparent or be ultraviolet transmissive. When considering production yield, efficiency and the like, an adhesive not having ultraviolet curing properties may also be applied to the fixing portion. That is, an adhesive that cures over time or a thermosetting adhesive may also be used.

The thickness of the sealing member ES may vary depending on the materials used and other factors. However, the sealing member ES is preferably thin in most cases and may be, for example, approximately 0.2 mm to 0.3 mm.

In the above description, the element substrate of the image element 80 is a silicon substrate, but other materials such as quartz glass may be used provided that sufficient heat dissipation and positional accuracy are ensured.

In addition to the above-described case where the case member CS is made of a metal having high thermal conductivity, various materials such as a resin material may be used as the case member CS or used for a portion of the case member CS, provided that heat dissipation of the image element 80 and positional accuracy when housing the image element 80 are ensured.

Various configurations may be used for the image element 80. For example, a configuration employing a reflective-type liquid crystal display device may be used, or a digital micro-mirror device or the like may be used in place of the image display element formed of a liquid crystal display device or the like.

In the above description, the half mirror layer of the second surface S12 is, for example, a metal reflective film or a dielectric multilayer film. However, the half mirror layer may be replaced with a planar or curved hologram element. The fifth surface S15 may also be configured of a mirror reflection surface or a hologram element.

In the above description, the light-guiding member 10 and other components extend in the lateral direction of the eyes, but the light-guiding member 10 may be disposed so as to extend in the vertical direction. In this case, the light-guiding member 10 has a structure arranged in parallel rather than in series.

In the above description, only an aspect in which the image light and the external light are superimposed is described. However, the present invention may be applied to a virtual image display apparatus that does not perform superimposition, in which the observer can switch between and observe an aspect in which only the image light is visible and an aspect in which only the external scene light is visible. As an example, the present disclosure can be applied to a display apparatus that performs so-called virtual reality (VR) image formation.

Furthermore, the optical system subject to the position adjustment is not limited to a projection lens such as that described above, and may be a direct-viewing optical system or an observation optical system.

The technology disclosed herein may also be used with a so-called see-through video product constituted by a display and an imaging device.

The technology disclosed herein, specifically the casing (image element unit structure) having a structure for dissipating heat when assembling the image display apparatus (image element) can also be used for a display apparatus such as a finder in a camera or a small projector.

In the above description, the adhesive AH is cured to bond or fix the case member CS and the lens barrel BR, and the case member CS and the lens barrel BR are positioned and fixed by forming the ultraviolet light curing resin UR. In other words, the two objects of the case member CS and the lens barrel BR are closely joined and do not separate due to the bonding between molecules by chemical reaction. However, in terms of the strength of the adhesive force between these two objects, that is, the type of bonding and fixing, various types of adhesive may be used depending on the purpose of adhesion or the like. For example, as described above, in addition to using a material that fixes (closely bonds) the two objects together as the adhesive, a material having a certain degree of elasticity after adhesion may be used as the adhesive to prevent failure of the head-mounted display when the head-mounted display is dropped or the like.

In addition, the excavated portion DG formed in the side surface of the lens barrel BR may have a variety of shapes. For example, a pool of pre-cured adhesive AH may be formed in the excavated portion DG such that the adhesive AH to become the ultraviolet light curing resin UR flows when performing temporary positioning (temporary fixing) and can be prevented from flowing into an unintended area.

As described above, a virtual image display apparatus according to one aspect of the present disclosure includes an image element, a case member that houses the image element, an optical system that receives image light emitted from the image element, a lens barrel that houses the optical system, and a sealing member that is elastic, the sealing member being configured to cover a space between the case member and the lens barrel.

In the above-described virtual image display apparatus, the elasticity of the elastic sealing member allows the position between the image element housed in the case member and the optical system housed in the lens barrel to be adjusted while the space between the case member and the lens barrel is sealed, and assembly to be performed thereafter. As a result, foreign material can be prevented from entering during these operations.

In a specific aspect of the present disclosure, the sealing member is a transparent tape-shaped member having an adhesive portion. With this configuration, the sealing member is fixed at a desired position between the case member and the lens barrel due to the adhesive portion, and light can be irradiated to the inside while the case member and the lens barrel are covered.

In another aspect of the present disclosure, the sealing member transmits ultraviolet light, and the case member and the lens barrel are fixed using an ultraviolet light curing resin. With this configuration, fixing with an ultraviolet light curing resin can be performed through the sealing member.

In yet another aspect of the present disclosure, one of the case member and the lens barrel includes a excavated portion and the other of the case member and the lens barrel includes a protruding portion corresponding to the excavated portion. The ultraviolet light curing resin is applied between the excavated portion and the excavated portion, and the sealing member covers at least partly the ultraviolet curing resin. With this configuration, a state can be formed in which the relative positional relationship between the lens barrel and the case member can be adjusted while maintaining a hermetically sealed state between the lens barrel and the case member through cooperation between the sealing member and the ultraviolet light curing resin (or an adhesive that serves as the ultraviolet light curing resin).

In yet another aspect of the present disclosure, the sealing member and the ultraviolet light curing resin hermetically seal the space between the case member and the lens barrel. With this configuration, the sealing member and the ultraviolet light curing resin (or the adhesive that serves as the ultraviolet light curing resin) can ensure a tight seal.

In yet another aspect of the present disclosure, the virtual image display apparatus further includes a temporary positioning portion configured to temporarily position the case member and the lens barrel to be in contact with each other, when the sealing member is attached to the case member and the lens barrel. With this configuration, adjustment to a desired position is possible after attaching the sealing member while securely attaching the sealing member.

In yet another aspect of the present disclosure, the temporary positioning portion is an L-shaped protruding portion provided at four corners of an end portion that is to be coupled during the temporary positioning. With this configuration, the protruding portions achieve accurate temporary positioning.

In yet another aspect of the present disclosure, at least one of a first display apparatus and a second display apparatus provided to correspondingly to left and right eyes has the case member, the lens barrel and the sealing member. With this configuration, positional adjustment can be performed while balancing the left and right sides.

In yet another aspect of the present disclosure, the virtual image display apparatus includes a light-guiding member positioned to be fixed to the lens barrel and configured to guide image light emitted from the optical system. With this configuration, the image light emitted from the optical system can be guided by the light-guiding member, which has been positioned precisely with respect to the lens barrel that houses the optical system.

In yet another aspect of the present disclosure, the size of a gap between the case member and the lens barrel is narrower than a width of the sealing member by 2 mm or more. With this configuration, a sufficient sealing member margin that can maintain a sufficient state of adhesion can be achieved.

A method for manufacturing a virtual image display apparatus according to an aspect of the present disclosure includes covering, with a sealing member that is elastic, space between a case member housing an image element and a lens barrel housing an optical system configured to receive image light from the image element, and positioning the case member and the lens barrel, with the case member and the lens barrel being covered by the sealing member.

In the method for manufacturing the virtual image display apparatus described above, when manufacturing the virtual image display apparatus, the position between the image element housed in the case member and the optical system housed in the lens barrel can be adjusted and then the case member and the lens barrel can be assembled while the space between the case member and the lens barrel is sealed. Thus, foreign material can be prevented from entering during these operations.

In a specific aspect of the present disclosure, positioning is performed for at least one of a first display apparatus and a second display apparatus provided correspondingly to left and right eyes. With this configuration, when manufacturing the virtual image display apparatus, positional adjustment can be performed while balancing the left and right sides.

What is claimed is:

1. A virtual image display apparatus comprising:
   an image element;
   a case member housing the image element;
   an optical system configured to receive image light emitted from the image element;
   a lens barrel housing the optical system; and
   a sealing member that is elastic, the sealing member being configured to cover a space between the case member and the lens barrel,
   wherein the sealing member is a transparent tape-shaped member having an adhesive portion.

2. The virtual image display apparatus according to claim 1, wherein
   the sealing member transmits ultraviolet light, and
   the case member and the lens barrel are bonded using an ultraviolet light curing resin.

3. The virtual image display apparatus according to claim 2, wherein
   one of the case member and the lens barrel includes an excavated portion,
   the other of the case member and the lens barrel includes a protruding portion corresponding to the excavated portion,
   the ultraviolet light curing resin is applied between the excavated portion and the excavated portion, and
   the sealing member covers at least partly the ultraviolet light curing resin.

4. The virtual image display apparatus according to claim 2, wherein the sealing member and the ultraviolet light curing resin hermetically seal the space between the case member and the lens barrel.

5. The virtual image display apparatus according to claim 1, comprising a temporary positioning portion configured to temporarily position the case member and the lens barrel to be in contact with each other, when the sealing member is attached to the case member and the lens barrel.

6. The virtual image display apparatus according to claim 5, wherein the temporary positioning portion is an L-shaped protruding portion provided at four corners of an end portion that is to be coupled during the temporary positioning.

7. The virtual image display apparatus according to claim 1, wherein at least one of a first display apparatus and a second display apparatus provided correspondingly to left and right eyes includes the case member, the lens barrel and the sealing member.

8. The virtual image display apparatus according to claim 1, comprising a light-guiding member positioned to be fixed to the lens barrel and configured to guide image light emitted from the optical system.

9. The virtual image display apparatus according to claim 1, wherein a size of a gap between the case member and the lens barrel is narrower than a width of the sealing member by 2 mm or more.

10. A method for manufacturing a virtual image display apparatus, the method comprising:
covering, with a sealing member that is elastic, a space between a case member housing an image element and a lens barrel housing an optical system configured to receive image light emitted from the image element; and
positioning the case member and the lens barrel, with the case member and the lens barrel being covered by the sealing member,
wherein the sealing member is a transparent tape-shaped member having an adhesive portion.

11. The method for manufacturing a virtual image display apparatus according to claim 10, wherein the positioning is performed for at least one of a first display apparatus and a second display apparatus provided correspondingly to left and right eyes.

12. The method for manufacturing a virtual image display apparatus according to claim 10, wherein
the sealing member transmits ultraviolet light, and
the case member and the lens barrel are bonded using an ultraviolet light curing resin.

13. A virtual image display apparatus comprising:
an image element;
a case member housing the image element;
an optical system configured to receive image light emitted from the image element;
a lens barrel housing the optical system; and
a sealing member that is elastic, the sealing member being configured to cover a space between the case member and the lens barrel, wherein
the sealing member transmits ultraviolet light, and
the case member and the lens barrel are bonded using an ultraviolet light curing resin.

* * * * *